(No Model.)  3 Sheets—Sheet 1.
J. G. PEACE.
COMBINED TABLE AND DESK.
No. 334,977.  Patented Jan. 26, 1886.
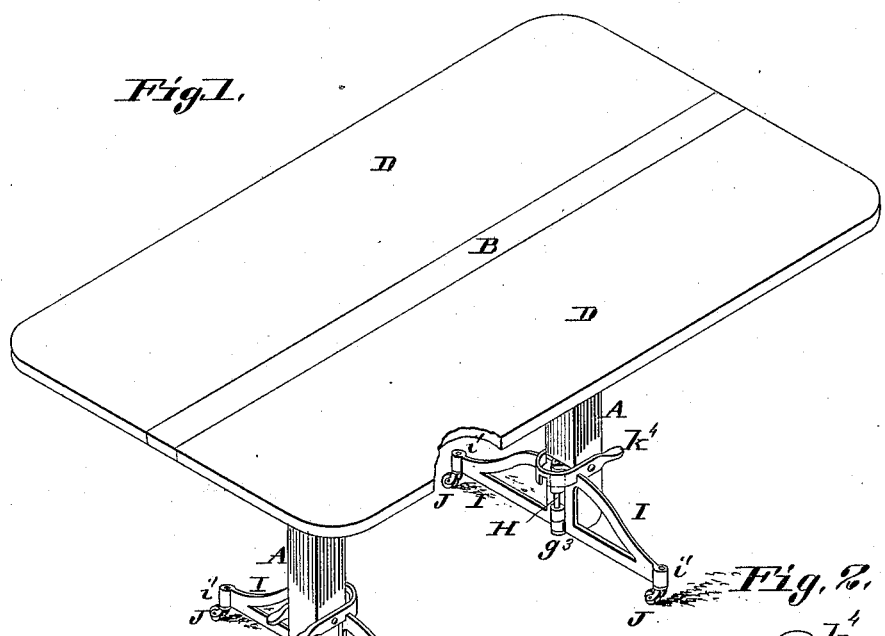
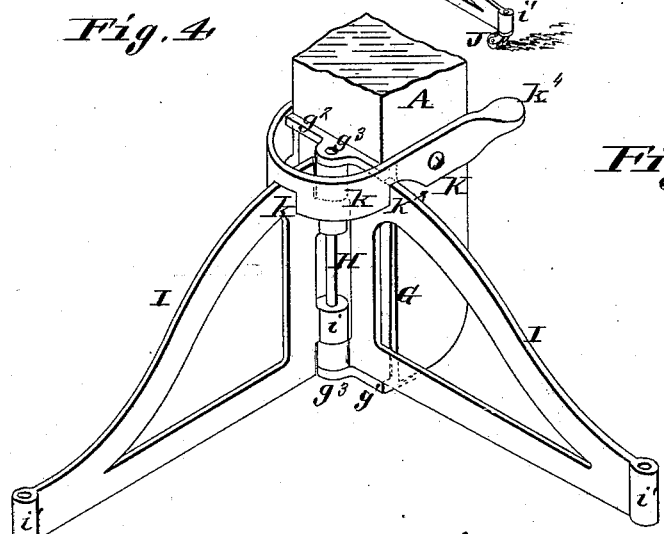
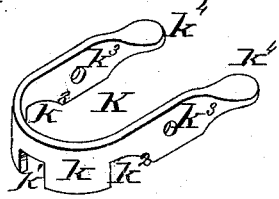
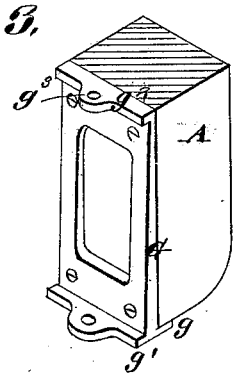
Attest:  Inventor:
F. A. Hopkins  John G. Peace
Edward Slur  By Knight Bros.
  Attys.

(No Model.)  3 Sheets—Sheet 2.
J. G. PEACE.
COMBINED TABLE AND DESK.
No. 334,977. Patented Jan. 26, 1886.
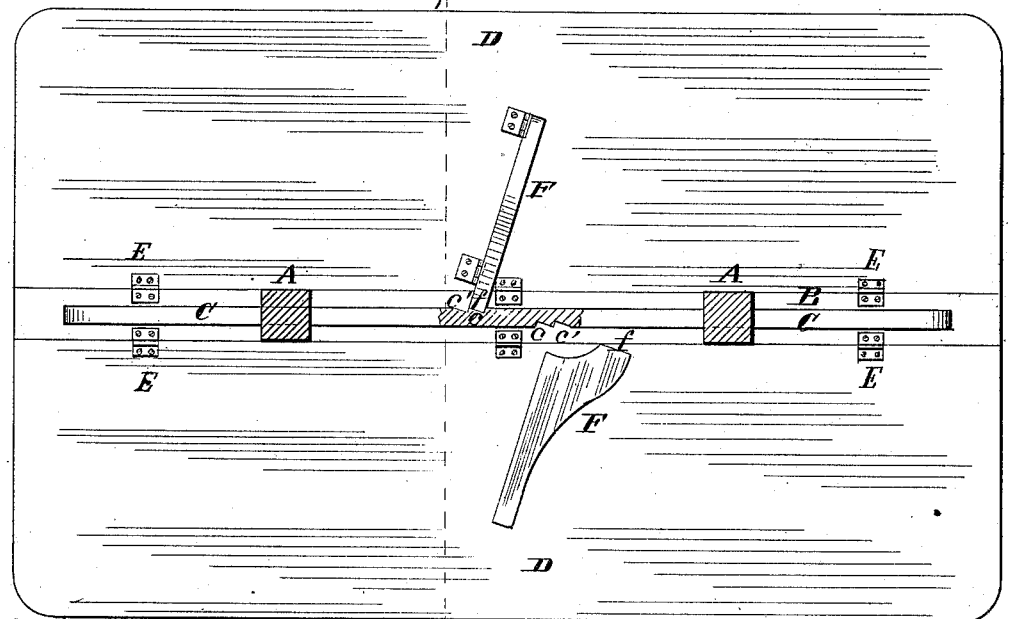
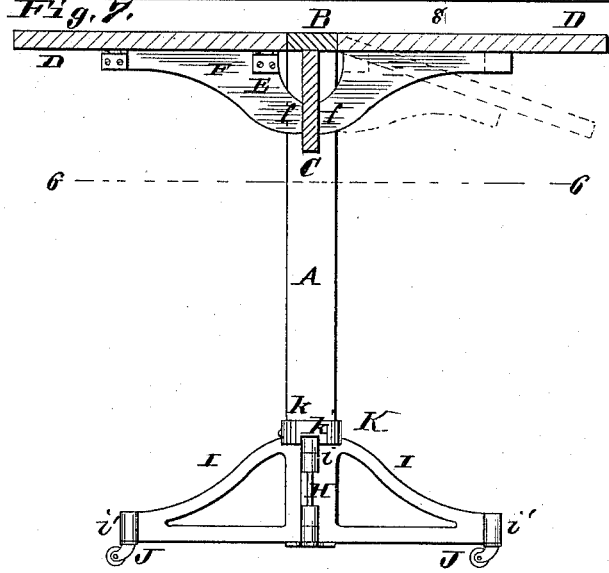
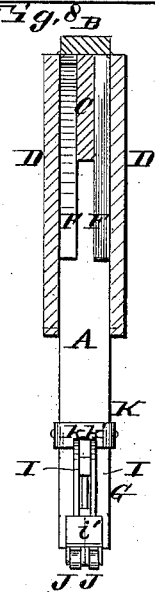
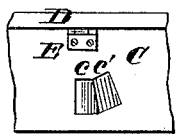
Attest: F. A. Hopkins, Edward Stu[...]
Inventor: John G. Peace
By Knight Bros.
Attys (No Model.)  3 Sheets—Sheet 3.

J. G. PEACE.
COMBINED TABLE AND DESK.

No. 334,977. Patented Jan. 26, 1886.

Attest:  
F. A. Hopkins  
Edward Stu...

Inventor:  
John G. Peace  
By Knight Bro.  
Attys.

UNITED STATES PATENT OFFICE.

JOHN G. PEACE, OF SALEM, MISSOURI.

COMBINED TABLE AND DESK.

SPECIFICATION forming part of Letters Patent No. 334,977, dated January 26, 1886.

Application filed August 1, 1885. Serial No. 173,241. (No model.)

*To all whom it may concern:*

Be it known that I, JOHN G. PEACE, of Salem, in the county of Dent and State of Missouri, have invented a certain new and useful Improvement in a Combined Table and Desk, of which the following is a full, clear, and exact description, reference being had to the accompanying drawings, forming part of this specification, in which—

Figure 10:
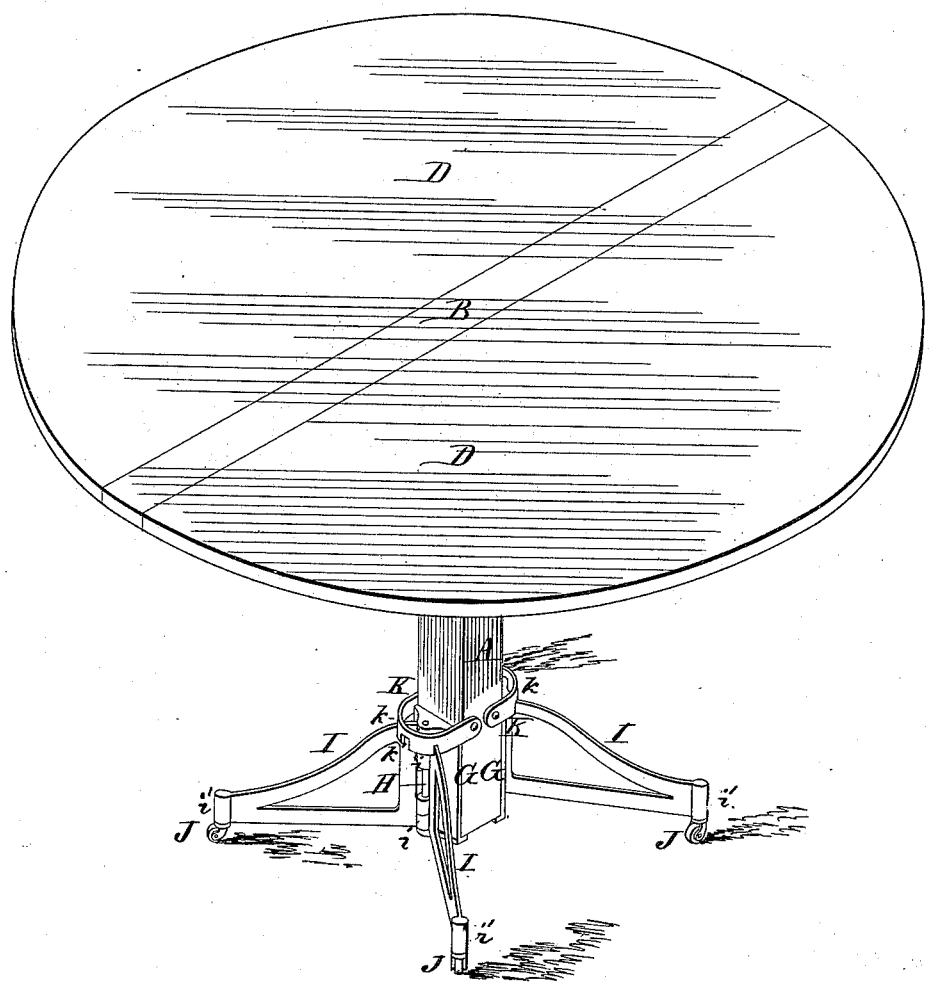
Figure 11:
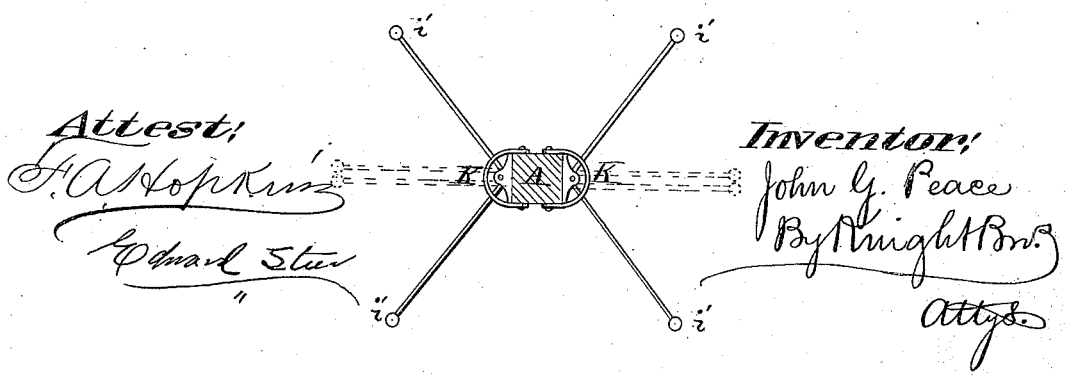

Figure 1 is a perspective view showing the table as arranged for use with both leaves in a horizontal position. Fig. 2 is a perspective view of the clamp. Figs. 3 and 4 are detail perspective views of the lower part of one of the legs. Fig. 5 is a horizontal section of one of the legs, showing the feet in top view. Fig. 6 is a horizontal section at 6 6, Fig. 7. Figs. 7 and 8 are transverse sections at 7 8, Fig. 6, showing it, respectively, open and folded. Fig. 9 is a detail view showing two of the inclined notches in which the brace engages. Figs. 10 and 11 show a modification.

My invention relates to certain improvements in those combined tables and desks in which a center piece is secured to supports which fold together beneath it, the leaf-braces also being beneath the center piece and the leaves occupying positions against the supports and braces when the parts are folded up; also, to those braces which are hinged to the leaves and whose inner ends occupy notches in the pieces on which they bear, the pieces being inclined to shorten the distance between them and the leaves for the purpose of making the brace rigid without any provision for inclining the leaves to any appreciable extent; and my invention consists in features of novelty hereinafter fully described, and pointed out in the claims.

The table has two legs, A, which may be made of a simple squared piece of wood, and which are connected together firmly at top by a horizontal strip, B, forming the fixed part of the table-top, and a strip, C, which passes through mortises in the legs. To the strip B the leaves D are connected by hinges E of any suitable construction.

F are braces hinged to the bottom of the leaves in an oblique position, so that as they are swung away or downward from the leaves their ends $f$ approach the strip C and may be made to enter either of the notches $c\ c'$. When the end $f$ rests in the notch $c$, the leaf is in a horizontal position; but when said end is in the notch $c'$ the leaf is sustained in an inclined position, as shown in dotted lines in Fig. 7.

G is a metal bracket, which is attached to the lower part of each leg, and which has a lip, $g$, extending beneath the end of the leg, and two lips, $g'$ and $g^2$, having eyes $g^3$ for the passage of a pintle-pin, H, by which the feet I are hinged to the bracket. The feet H have pintle-lugs $i$, through which the pintle H passes, and have at their ends socket $i'$ to receive the shanks of casters J.

K is a hinged clamp, having a bow, $k$, which is notched out at $k'$ and $k^2$ to receive the upper part of the feet I and clamp them, respectively, in the extended or the folded position. (See Fig. 4.) The clamps are hinged to the legs by pins or screws passing through the eyes $k^3$.

$k^4$ are treadles, by downward pressure upon which the bow $k$ is lifted and disengaged from the feet I.

It will be seen by examination of Fig. 3 that the bracket G is thicker at the lower part than at the upper, so that as the feet are turned from the outward position shown in Figs. 1 and 7 to the folded position shown in Figs. 5 and 8 the casters are gradually elevated.

It will be seen that when the feet are extended they rest firmly between the lips $g'$ and $g^2$, so that they are firmly braced and give firm support to the table.

The table when folded, as seen in Fig. 8, occupies a very small space—so small in fact that there is no object in making it to knock down, as the parts could scarcely be packed together in smaller compass if disconnected. It may be used as a wall desk or table by lifting only one of the leaves and setting out one of the feet only, as seen in Fig. 4.

Instead of making the bracket G thicker at the lower part, so as to give the described inclination to the hinge of the feet, the surface to which the bracket is attached may be inclined.

In Figs. 10 and 11 is shown a modification where a single leg, A, is used and four hinged feet arranged to fold together, as shown in dotted lines in Fig. 11, and to be spread out when the table is in use rectangularly from each other, each foot moving forty-five degrees from its folded position, as seen in Fig. 10. The notches $k'$ and $k^2$ and the brackets G are so arranged and constructed as to hold the feet in the required position when they are opened out, as seen in Fig. 10, or folded together, as shown in Fig. 11.

I claim—

1. A table or desk comprising a top strip, a leg rigidly secured thereto, a leaf hinged to the top strip, a brace by which the leaf is supported, feet hinged to the leg, and a clamp having notches to engage the feet and hinged to the leg, substantially as set forth.

2. A table or desk comprising a top strip, a leg rigidly secured thereto, a leaf hinged to the top strip, a brace by which the leaf is supported, feet hinged to the leg, and a clamp having notches to engage the feet and formed with treadles, the clamp being hinged to the leg, substantially as set forth.

3. The combination, with a table or desk having a hinged leaf, of a vertical strip, C, beneath the horizontal strip, having vertical notch $c$ and inclined notch $c'$, and a brace, F, hinged to the leaf obliquely to the latter, and vertical strip having an end, $f$, for engaging the notches to support the leaf in an inclined as well as in a horizontal position, substantially as shown and described.

JOHN G. PEACE.

Witnesses:
SAML. KNIGHT,
GEO. H. KNIGHT.